United States Patent Office

2,946,766
PROCESS FOR PRODUCING POLYCARBONATES

Hermann Schnell, Krefeld-Uerdingen, and Gerhard Fritz, Krefeld-Bockum, Germany, assignors to Farbenfabriken Bayer Aktiengesellschaft, Leverkusen, Germany, a corporation of Germany No Drawing. Filed July 9, 1956, Ser. No. 596,398

Claims priority, application Germany Dec. 21, 1955

9 Claims. (Cl. 260—47)

By transforming di-monohydroxyarylene alkanes or mixtures thereof with aliphatic or cycloaliphatic or aromatic dihydroxy compounds, or di-monohydroxyarylene sulphones, or mixtures of other aromatic and aliphatic or cycloaliphatic dihydroxy compounds into high molecular polycarbonates according to U.S. patent applications Ser. Nos. 461,938, filed October 12, 1954, 557,256, filed January 4, 1956, 572,793, filed March 21, 1956, 572,802, filed March 21, 1956, and 583,382, filed May 8, 1956, high molecular weight, high melting polyesters of carbonic acid are obtainable which can be developed from the melt or from solutions into shaped bodies such as films, fibres, coatings, lacquers, injection mouldings etc., and which possess good mechanical properties, a high softening point, small water absorptions and outstanding electrical properties, high stability to elevated temperatures in the presence of air or oxygen and also against chemical agents; and which can be orientated by stretching.

A process for producing these polycarbonates consists in inter-esterifying the dihydroxy compounds of the types described, with diesters of the carbonic acid with aliphatic, cycloaliphatic or aromatic monohydroxy compounds.

This process, leading in a simple way to high molecular weight film or fibre forming products, has the disadvantage that in the inter-esterification an excess of the carbonic diester must be applied since with the aliphatic, cycloaliphatic or aromatic monohydroxy compounds which separate, the loss of part of the diester can in practice only be avoided with difficulty.

According to the present invention this disadvantage is avoided, by using, for the production of high molecular weight polycarbonates by inter-esterification, dialkyl-dicycloalkyl- or diaryl-di-carbonates of aromatic dihydroxy compounds, especially of di-monohydroxyarylene alkanes, alone or mixed with the dihydroxy compounds referred to.

The aforementioned dicarbonates of the aromatic dihydroxy compounds are easily obtainable e.g. by reacting the sodium salt of the aromatic dihydroxy compounds with 2 moles of an alkyl-, cycloalkyl-, or aryl-chlorocarbonate. Thus for example one obtains by reacting the sodium salt of 2,2-(4,4'-dihydroxydiphenylene)propane with phenyl chlorocarbonate in aqueous alkali medium, the bis-phenyl carbonate of 2,2-di(p-hydroxyphenylene)propane, having the melting point 102–104° C., in practically quantitative yield.

For carrying out the process according to the invention the following carbonates of aromatic dihydroxy compounds are suitable:

Bis-alkyl, e.g. bis-ethyl, bis-propyl, bis-isopropyl, bis-butyl, bis-amyl, bis-hexyl, bis-cycloalkyl, e.g. bis-cyclohexyl and bis-methylcyclohexyl, and bis-aryl, e.g. bis-phenyl, bis-cresyl, bis-cyclohexylphenyl and bis-naphthyl carbonates of resorcinol, hydroquinone, 2,4-dioxytoluene, 2,5-dioxytoluene, 3,5-dioxytoluene, 4,4'-dioxydiphenyl, 2,4'-dioxydiphenyl, 4,4'-dioxy-3-cyclohexyl-diphenyl, 1,4-dioxynaphthalene, 1,6-dioxynaphthalene, 2,6-dioxynaphthalene, 1,5-dioxyanthracene and of di-monooxyarylene)-alkanes in particular 2,2-[diphenyl-(diphenylene)-dicarbonate]-propane. Mixtures of bis-carbonates of the dimonohydroxyaryl alkanes with monohydroxy compounds can also be used.

By heating these bis-alkyl, -cycloalkyl, or -aryl carbonates of the aromatic dihydroxy compounds, preferably under reduced pressure, one obtains, with separation of neutral alkyl, cycloalkyl, or aryl carbonates, a high molecular weight polycarbonate. If the said compounds are mixed with a dihydroxy compound, high molecular weight polycarbonates are obtained by inter-esterification. If, for example, one mol of the bis-phenyl carbonate of 2,2-di-(p-hydroxyphenylene)propane is inter-esterified with one mol of 2,2-di-(p-hydroxyphenylene)propane itself, the polycarbonate of the 2,2-di-(p-hydroxyphenylene)propane is obtained accompanied by separation of phenol. This process has the advantage that the quantity of phenol split off per unit weight of polycarbonate formed is less than in other inter-esterification processes.

The inter-esterifications are mostly carried out at temperatures between 50 and 350° C., preferably between 120–280° C., in the presence of an indifferent gas such as nitrogen and under reduced pressure. They can be accelerated by adding catalysts with special advantage basic esterification catalysts.

The following examples are given for the purpose of illustrating the invention, the parts being by weight.

Example 1

A mixture of 46.8 parts of bis-phenylcarbonate of 2,2-di-(p-hydroxyphenylene)-propane, 0.008 part of calcium hydride, and 0.008 part of sodium benzoate is melted together under nitrogen and with stirring. The diphenyl carbonate split off is distilled off at 200° C. under a pressure of 2 mm. mercury gauge. The mixture is then stirred for half an hour at 280° C. at 0.2 mm. mercury gauge pressure, whereby a colourless high molecular weight thermoplastic polycarbonate is obtained which softens at about 230° C., possesses a K-value of 52 measured in m-cresol and can be worked up from solutions, e.g. in methylene chloride or from the melt, into stretchable filaments or fibres and injection mouldings.

Example 2

A mixture of 38 parts of the bis-phenylcarbonate of 2,2-di-(p-hydroxyphenylene)-propane and 8 parts of the bis-ethylcarbonate of 2,2-di-(p-hydroxyphenylene)-propane and 0.001 part of the sodium salt of 2,2-di-(p-hydroxyphenylene)-propane is melted together under a nitrogen atmosphere with stirring. The neutral carbonate formed is distilled off at 200° C. under a pressure of 5 mm. mercury gauge. By further heating to 260–280° C. under a pressure of 0.2 mm. mercury gauge, a highly viscous melt is obtained. The colourless high molecular weight resin so produced with a softening point of about 230° C. and the K-value of 51 measured in m-cresol shows the same properties as the product described in Example 1.

Example 3

A mixture of 550 parts of bis-phenyl carbonate of 2,2-di-(p-hydroxyphenylene)-propane, 228 parts of 2,2-di-(p-hydroxyphenylene)-propane, and 0.015 part of the sodium salt of 2,2-di-(p-hydroxyphenylene)-propane is melted together with stirring and under a nitrogen atmosphere. At temperatures between 150 and 200° C. the phenol produced is distilled off under filter-pump vacuum. After a further 3 hours heating at 280° C. under a pressure of 0.5 mm. mercury gauge a resin is obtained, the properties of which correspond to those described in Example 1. The resin may be worked up from the molten state at temperatures up to above 300° C.

Example 4

A mixture of 42.1 parts of the bis-phenyl carbonate of 2,2-(4,4'-dihydroxy-diphenylene)-propane (0.09 mol), 5 parts of the bis-phenyl carbonate of 4,4'-di-hydroxy-3-cyclohexyl-diphenyl (0.01 mol), melting point 145–146° C., and 0.015 part of the sodium salt of 2,2-(4,4'-di-hydroxy-diphenylene)-propane is melted with stirring and under a nitrogen atmosphere at 200° C. and under a pressure of 12 mm. mercury gauge. Hereby the bulk of the diphenyl carbonate split off is distilled off. Then the pressure is reduced to 0.5 mm. mercury gauge and the temperature of the melt is kept for half an hour at 250° C. and then for 1½ hours at 270° C. After cooling a thermoplastic polycarbonate is obtained which has a K-value of 43, measured in methylene chloride solution, and a softening point of about 220° C. It is soluble for instance in methylene chloride, chloroform, chlorobenzene and cresol and may be worked up from solutions or from the melt to fibres and films and injection mouldings.

Example 5

From a mixture of 42.1 parts of the bis-phenyl carbonate of 2,2-(4,4'-dihydroxy-diphenylene)-propane (0.09 mol), 4 parts of the bis-phenyl carbonate of 1,6-dihydroxy-naphthalene (0.01 mol, melting point 155–156°) and 0.015 part of the sodium salt of 2,2-(4,4'-dihydroxy-diphenylene)-propane a high molecular weight thermoplastic polycarbonate of a K-value of 47 is obtained as described in Example 4 and with similar properties. Both polycarbonates are distinguished by a low tendency for crystallisation.

Example 6

15 parts of the bis-phenyl carbonate of resorcinol (melting point 124–125° C.) and 0.01 part of the sodium salt of 2,2-(4,4'-dihydroxy-diphenylene)-propane are melted together under nitrogen and with stirring. At 200° C. and under a pressure of 12 mm. mercury gauge the splitting off of the diphenyl carbonate begins. After half an hour the pressure is reduced to 1.2 mm. mercury gauge and the melt is stirred for 2 hours at 220° C. The melt slowly becomes highly viscous and is heated for further 2 hours at 250° C. and finally for a further hour at 270° C. under 0.5 mm. mercury gauge. A yellowish thermoplastic polycarbonate is obtained which melts at about 210° C. It may be worked up from solutions or from the melt into mouldings.

Example 7

20 parts of the bis-cresyl carbonate of 2,2-(4,4'-dihydroxy-diphenylene)-propane and 0.01 part of lithium-hydride are melted together under nitrogen and with stirring. The bulk of the dicresyl carbonate split off is distilled off at 200° C. and under a pressure of 2 mm. mercury gauge. After heating for further 3 hours at 280° C. and under a pressure of 0.4 mm. mercury gauge a highly viscous melt is obtained. The resulting thermoplastic polycarbonate may be worked up from solutions or from the melt into films or fibres and injection mouldings.

We claim:

1. A process for producing high molecular weight film and fiber-forming resinous linear polycarbonates, which consists essentially of heating at a temperature between 120 and 280° C., and at a reduced pressure a composition that consists essentially of (I) a compound selected from the class consisting of aryl, alkyl and cycloalkyl diesters of the bis-monocarbonates of aromatic dihydroxy hydrocarbons, and (II) no more than an equimolar amount of an unesterified aromatic dihydroxy compound, and continuing the heating for a time sufficient to cause linear interesterification and the formation of the desired polycarbonate.

2. The process of claim 1 in which the aromatic dihydroxy hydrocarbons are di-(monohydroxyaryl) alkanes.

3. The process of claim 1 in which the (I) compound is the bis-phenyl ester of the bis-monocarbonate of 2,2-di-(parahydroxy phenyl)-propane and no (II) compound is present in the composition.

4. The process of claim 1 in which the composition consists essentially of the bis-phenyl ester and the bis-ethyl ester of the bis-monocarbonate of 2,2-di-(parahydroxy phenyl)-propane.

5. The process of claim 1 in which the composition consists essentially of the bis-phenyl ester of the bis-monocarbonate of 2,2-di-(parahydroxy phenyl)-propane, and unesterified 2,2-di-(parahydroxy phenyl)-propane.

6. The process of claim 1 in which the composition consists essentially of the bis-phenyl ester of the bis-monocarbonate of 2,2-di-(parahydroxy phenyl)-propane, and the bis-phenyl ester of the bis-monocarbonate of 4,4'-dihydroxy-3-cyclohexyl-diphenyl.

7. The process of claim 1 in which the composition consists essentially of the bis-phenyl ester of the bis-monocarbonate of 2,2-di-(parahydroxy phenyl)-propane, and the bisphenyl ester of the bis-monocarbonate of 1,6-dihydroxy naphthalene.

8. The process of claim 1 in which the composition consists essentially of the bis-phenyl ester of the bis-monocarbonate of 2,2-di-(parahydroxyphenyl)-propane, and resorcinol.

9. The process of claim 1 in which the (I) compound is the bis-cresyl ester of the bis-monocarbonate of 2,2-di-(parahydroxy phenyl)-propane and no (II) compound is present in the composition.

References Cited in the file of this patent

UNITED STATES PATENTS

| 2,058,394 | Arvin | Oct. 27, 1936 |
| 2,210,817 | Peterson | Aug. 6, 1940 |
| 2,370,568 | Muskat et al. | Feb. 27, 1945 |
| 2,455,652 | Bralley | Dec. 7, 1948 |
| 2,455,653 | Bralley et al. | Dec. 7, 1948 |
| 2,517,965 | Bohl | Aug. 8, 1950 |
| 2,595,343 | Drewitt | May 6, 1952 |

FOREIGN PATENTS

| 546,376 | Belgium | Mar. 23, 1956 |
| 546,377 | Belgium | Mar. 23, 1956 |